(12) United States Patent
Tableau et al.

(10) Patent No.: US 10,934,872 B2
(45) Date of Patent: Mar. 2, 2021

(54) TURBOMACHINE CASE COMPRISING A CENTRAL PART PROJECTING FROM TWO LATERAL PORTIONS IN A JUNCTION REGION

(71) Applicant: SAFRAN AIRCRAFT ENGINES, Paris (FR)

(72) Inventors: Nicolas Paul Tableau, Moissy-Cramayel (FR); Sebastien Serge Francis Congratel, Moissy-Cramayel (FR); Antoine Claude Michel Etienne Danis, Moissy-Cramayel (FR); Maurice Guy Judet, Moissy-Cramayel (FR); Lucien Henri Jacques Quennehen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 180 days.

(21) Appl. No.: 16/166,435

(22) Filed: Oct. 22, 2018

(65) Prior Publication Data

US 2019/0128132 A1     May 2, 2019

(30) Foreign Application Priority Data

Oct. 23, 2017   (FR) ...................... 17 59986

(51) Int. Cl.
*F01D 11/08* (2006.01)
*F01D 9/04* (2006.01)
(Continued)

(52) U.S. Cl.
CPC ............ *F01D 11/005* (2013.01); *F01D 5/147* (2013.01); *F01D 5/284* (2013.01); *F01D 9/04* (2013.01);
(Continued)

(58) Field of Classification Search
CPC .......... F01D 11/05; F01D 5/147; F01D 5/284; F01D 9/04; F01D 11/08; F01D 25/005;
(Continued)

(56) References Cited

U.S. PATENT DOCUMENTS

2016/0040547 A1* 2/2016 Clouse ................. F01D 11/08
                                                60/805
2016/0047266 A1* 2/2016 Powell ................. F01D 11/22
                                                415/1
(Continued)

FOREIGN PATENT DOCUMENTS

FR    2 919 345      1/2009
FR    3 036 433     11/2016
(Continued)

OTHER PUBLICATIONS

French Preliminary Search Report dated May 25, 2018 in French Application 17 59986, filed on Oct. 23, 2017 (with English Translation of Categories of Cited Documents).

*Primary Examiner* — J. Todd Newton
(74) *Attorney, Agent, or Firm* — Oblon, McClelland, Maier & Neustadt, L.L.P.

(57) ABSTRACT

A support case for a turbomachine ring sector includes an annular body around a longitudinal axis of the case, and a downstream edge for attachment of the ring sector. The downstream edge extends from the body radially towards the inside of the case. The downstream edge extends circumferentially along a junction region between the body and a fixed vanes stage. The junction region includes a central portion and two lateral portions located on each side of the central portion, along a circumferential direction of the case with respect to its longitudinal axis. The central portion projects radially outwards from the case with respect to the lateral portions.

17 Claims, 2 Drawing Sheets

(51) Int. Cl.
F01D 25/24 (2006.01)
F01D 25/28 (2006.01)
F01D 5/14 (2006.01)
F01D 5/28 (2006.01)
F01D 11/00 (2006.01)
F01D 25/00 (2006.01)

(52) U.S. Cl.
CPC ............ *F01D 11/08* (2013.01); *F01D 25/005* (2013.01); *F01D 25/24* (2013.01); *F01D 25/243* (2013.01); *F01D 25/28* (2013.01); *F05D 2240/11* (2013.01); *F05D 2240/14* (2013.01); *F05D 2240/55* (2013.01); *F05D 2240/90* (2013.01); *F05D 2300/6033* (2013.01)

(58) Field of Classification Search
CPC ........ F01D 25/24; F01D 25/243; F01D 25/28; F05D 2240/11; F05D 2240/14; F05D 2240/55; F05D 2240/90; F05D 2300/6033

USPC ...................................................... 415/173.1
See application file for complete search history.

(56) References Cited

U.S. PATENT DOCUMENTS

| 2016/0090866 | A1* | 3/2016 | Hurst ...................... F01D 11/08 415/173.1 |
| 2016/0186999 | A1* | 6/2016 | Freeman ................. F01D 25/28 60/753 |
| 2017/0101882 | A1* | 4/2017 | Sippel .................. F01D 11/005 |
| 2018/0058262 | A1* | 3/2018 | Schiessl .................. F01D 9/041 |
| 2018/0080343 | A1* | 3/2018 | Groleau .................... F01D 9/04 |

FOREIGN PATENT DOCUMENTS

| FR | 3 041 993 | 4/2017 |
| WO | WO 2016/146942 A1 | 9/2016 |

* cited by examiner

TURBOMACHINE CASE COMPRISING A CENTRAL PART PROJECTING FROM TWO LATERAL PORTIONS IN A JUNCTION REGION

TECHNICAL FIELD

The invention relates to the technical field of aircraft turbomachines such as turbojets and turboprops. More precisely, the invention relates to high pressure turbine cases for a turbomachine.

BACKGROUND OF THE INVENTION

Each stage of a high pressure turbine for a turbomachine comprises a mobile blades rotor and a guide vane assembly fitted with fixed vanes. The rotor is free to rotate relative to the guide vane assembly about the longitudinal axis of the turbomachine and inside a sectorised ring.

This sectorised ring is fixed to a support case that is mechanically connected to the guide vane assembly. The support case comprises an annular body. It comprises an upstream edge and a downstream edge between which ring sectors are fixed.

The ring sectors are made from a ceramic matrix composite in a known manner while the support case is made of a metallic material. The material from which the ring sectors are made has a differential coefficient of expansion higher than that of the material from which the support case is made. Such a support case and such ring sectors are known for example as disclosed in patent FR 3 041 993.

Due to this difference in material, differential expansions of ring sectors relative to the support case are large, which tends to cause leaks. The ring sectors are also very rigid and their mechanical strength is low compared with the support case.

However, ring sectors are clamped by cold constraint to the support case such that, when the turbomachine is in operation, leaks between ring sectors and the support case are limited, despite differential expansions. Therefore mechanical forces transmitted through the support case to the ring sectors can be very high.

Therefore there is a need to limit mechanical forces transmitted through the support case to ring sectors, while limiting air leaks between ring sectors and the support case.

PRESENTATION OF THE INVENTION

The invention is aimed at at least partially solving problems encountered in solutions according to prior art.

In this respect, the purpose of the invention is a support case for a turbomachine ring sector. The support case comprises an annular body around a longitudinal axis of the case, and a downstream ring sector attachment edge.

The downstream edge extends from the body radially towards the inside of the case and circumferentially along a junction region between the body and a guide vane assembly.

The junction region comprises a first connection region configured to connect the body to the downstream edge and a second connection region configured to be fixed to the guide vane assembly.

According to the invention, the first connection region comprises a central portion and two lateral portions located on each side of the central portion, along a circumferential direction of the case relative to its longitudinal axis. The central portion projects radially outwards from the case, beyond the lateral portions.

Due to the support case according to the invention, the intensity of mechanical forces applied by the support case on the ring sector is reduced while air leaks at the junction between the ring sector and the support case are limited, and while limiting the mass of the turbomachine.

In particular, the support case according to the invention is less rigid at the lateral portions that the case at the central portion, which results in a more uniform distribution of mechanical forces transmitted by the support case to the ring sector. The improved mechanical contact of the support case and the ring sector during operation of the module can also reduce losses between the support case and the ring sector.

The central portion extends particularly from an external axial surface of the body projecting radially outwards beyond the lateral portions.

Optionally, the invention may include one or several of the following characteristics, possibly but not necessarily combined with each other.

Advantageously, at least one of the lateral portions comprises a recess in an external surface of the body.

According to one particular embodiment, the central portion comprises a portion projecting from the external surface of the body. Preferably, the projecting portion comprises a boss. A boss is preferably provided for each sealing ring sector.

According to one advantageous embodiment, the support case comprises an upstream edge for attachment of the ring sector, the upstream edge extending from the body radially towards the inside of the case and circumferentially along the body.

According to one advantageous embodiment, the second connection region comprises a downstream attachment edge that is located downstream from the central portion and lateral portions, to fix the case to the guide vane assembly.

According to one particular embodiment, the maximum projection height of the central portion above at least one of the lateral portions is between 3 mm and 30 mm.

According to one particular embodiment, the circumferential length of the central portion relative to the circumferential length of a ring sector is between ⅕ and ⅘.

In particular, the circumferential length of the boss of the central portion relative to the circumferential length of the ring sector is between ⅕ and ⅘.

According to another particular embodiment, the circumferential length of at least one lateral portion relative to the circumferential length of a ring sector is between 1/10 and ⅖.

Advantageously, the junction region is substantially symmetric about a median longitudinal section plane of the support case.

Preferably, the support case is approximately symmetric about the median plane.

According to one particular embodiment, the downstream edge comprises a lip that will come into contact with a downstream leg of the ring sector.

The invention applies particularly to a turbine ring assembly comprising a case like that defined above and a ring sector that is fixed to the case. The ring sector comprises an upstream leg that is fixed to the upstream edge of the support case and a downstream leg that is fixed to the downstream edge, preferably by studs.

Preferably, the support case is made from a metallic material.

Preferably, the ring sector is made from a ceramic matrix composite material.

According to one particular embodiment, the ring assembly comprises a plurality of ring sectors adjacent to each other around the circumferential direction and fixed to the support case.

The first connection region comprises particularly one central portion along the circumferential direction for each ring sector. Each central portion is circumferentially located between two lateral portions. Each central portion projects radially outwards from the case beyond the lateral portions that are adjacent to this central portion.

The invention also relates to a turbine for a turbomachine, comprising a set of rings like those defined above.

Preferably, the turbine is a high pressure turbine.

Preferably, a high pressure guide vane assembly is mechanically fixed to the support case, upstream from the ring sector.

Finally, the invention relates to a turbomachine comprising a turbine like that described above.

BRIEF DESCRIPTION OF THE DRAWINGS

This invention will be better understood after reading the description of example embodiments, given purely for information and in no way limitative, with reference to the appended drawings on which.

DETAILED PRESENTATION OF PARTICULAR EMBODIMENTS

Identical, similar or equivalent parts of the different figures have the same numeric references to facilitate the comparison between different figures.

Figure 1:
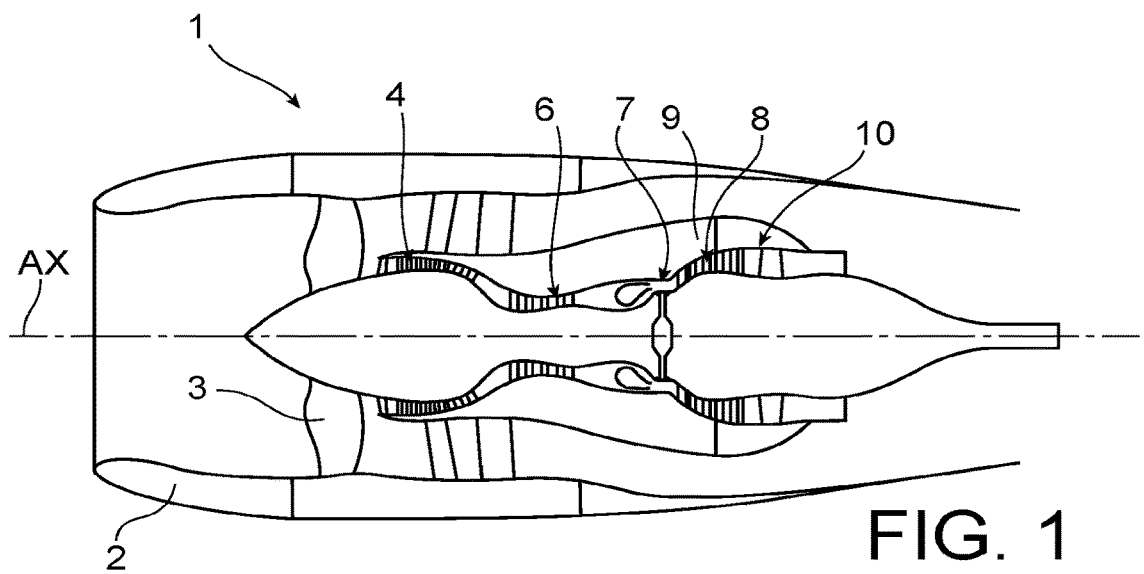
FIG. 1 is a partial diagrammatic longitudinal sectional view of a turbomachine, according to a first embodiment of the invention.

FIG. 1 shows a turbofan engine 1. The turbomachine 1 is a turbojet that is in a shape of revolution about a longitudinal axis AX.

The turbomachine 1 comprises an air intake duct 2, a fan 3, a low pressure compressor 4, a high pressure compressor 6, a combustion chamber 7, a high pressure turbine 8 and a low pressure turbine 10, in this order from upstream to downstream along the flow path of a core flow.

In this document, the upstream and downstream directions refer to the global flow of gases in the turbomachine 1, these directions being substantially parallel to the direction of the longitudinal axis AX.

The low pressure compressor 4, the high pressure compressor 6, the high pressure turbine 8 and the low pressure turbine 10 delimit a primary core flow stream. They are surrounded by a bypass flow through the turbomachine 1.

The high pressure compressor 6 and the high pressure turbine 8 are mechanically connected by a drive shaft 3 of the high pressure compressor 6, to form a high pressure body of the turbomachine 1. Similarly, the low pressure compressor 4 and the low pressure turbine 10 are mechanically connected by a shaft of the turbomachine, so as to form a low pressure body of the turbomachine 1.

The low pressure compressor 4, the high pressure compressor 6, the combustion chamber 7, the high pressure turbine 8 and the low pressure turbine 10 are surrounded by a case 9 that extends from the intake duct 2 to the low pressure turbine 10.

Figure 2:
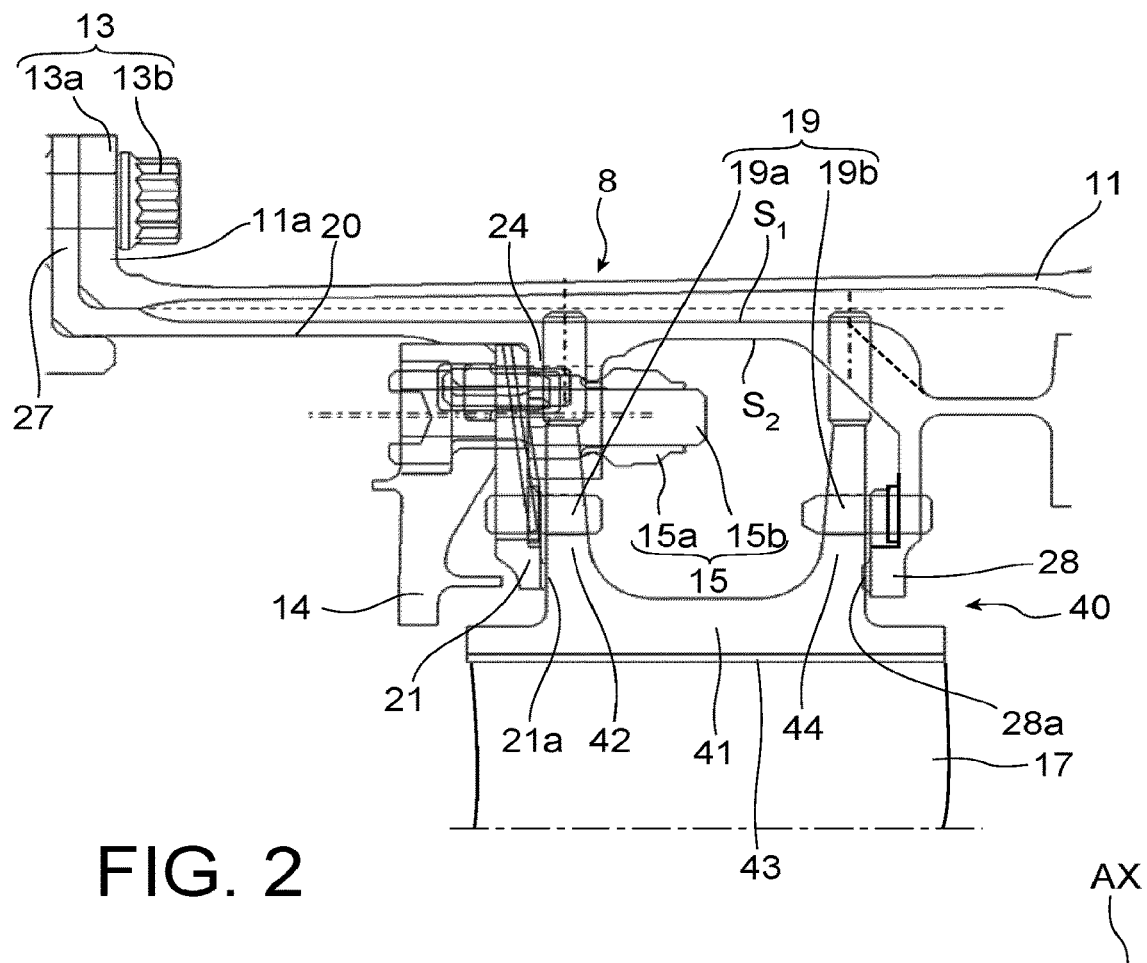
FIG. 2 is a partial diagrammatic longitudinal sectional view of a high pressure turbine of the turbomachine according to the first embodiment.

FIG. 2 partially shows a stage of the high pressure turbine 8. Each stage or the high pressure turbine stage comprises a mobile blades rotor and a guide vane assembly (not shown).

The guide vane assembly forms part of the turbomachine stator. It is divided into annular sectors, each of which comprises fixed vanes at a spacing from each other around the longitudinal axis AX.

The rotor is free to rotate about the longitudinal axis AX of the turbomachine, inside ring sectors 40, only one of which is shown on FIG. 2. These ring sectors 40 are at a spacing from each other around a circumferential direction C-C and they are fixed to a support case 20 through an upstream case 21.

The turbine stage comprises a turbine case 11, the support case 20, a guide vane assembly attachment flange 14 and the sectorised upstream case 21. The support case 20, the attachment case 14 and the upstream case 21 jointly form a support structure for ring sectors 40.

The longitudinal section of each ring sector 40 is generally in the shape of an inverted pi. The ring sectors 40 are made from a ceramic matrix composite material so that they have high resistance to the temperature of the hot air flow in the flowstream of the high pressure turbine 8.

Each ring sector 40 comprises an annular base 41, an upstream leg 42 and a downstream leg 44. The annular base 41 supports a layer of abradable material 43 that delimits the lower surface of the ring sector. The layer of abradable material 43 is to be contacted by the tip of the corresponding mobile blades 17. It maintains leak tightness between these blades 17 and the ring sector 40.

The upstream leg 42 is fixed to the upstream leg 21 by upstream fasteners 19a, only one of which is shown on FIG. 2. The downstream leg 44 is fixed to a downstream edge 28 of the support case 20 by downstream fasteners 19b, only one of which is shown on FIG. 2.

The upstream fasteners 19a and the downstream fasteners 19b are studs that engage the legs 42, 44 to limit the radial displacement of the ring sector 40 relative to the mobile blades 17. Together, they form means 19 for attachment of the ring sector 40 to the support case 20.

The turbine case 11 is a case delimiting the exterior of the high pressure turbine 8. It is mechanically connected to a combustion chamber case by an upstream attachment element 13.

This upstream attachment element 13 conventionally comprises a screw 13a and a nut 13b. It connects an upstream edge 11a of the turbine case 11 to an upstream edge 27 of the support case 20. The upstream edge 27 of the support case is connected to a downstream edge of the combustion chamber case by the attachment device 13.

The support structure of the ring sectors is described below with reference to both of FIGS. 2 and 3.

The attachment flange 14 is configured so that an upstream guide vane assembly can be fixed to it. It act as an axial stop for the upstream guide vane assembly. It is configured to transmit mechanical forces from the upstream guide vane assembly to the support case 20, while limiting mechanical forces applied on the ring sectors 40 by this upstream guide vane assembly. Therefore it is a case that resists forces from the upstream guide vane assembly. The case 14 is mechanically connected to the support case 20 and to the upstream case 21 by an attachment element 15.

The attachment element 15 of the attachment case conventionally comprises a screw 15a and a tightening element 15b comprising a nut. It connects a downstream face of the attachment case to the upstream case 21 and to the upstream edge 24 of the support case.

The upstream case 21 extends in the axial direction between the attachment case 14 and an upstream edge 24 of the support case 20. It is divided into adjacent sectors along the circumferential length. It extends over substantially the entire circumferential length C-C of the case.

The upstream case 21 comprises a lip 21a configured to form a straight line support adjacent to the upstream leg 42 of the ring sector, to limit leaks between the upstream case 21 and the ring sector 40. The upstream case 21 is used to fix the upstream leg 42 of the ring sector 40 to the support case 20 by means of studs 19a. By being sectorised, the upstream flange 21 limits mechanical forces from the support case 20 onto the upstream leg 42 of each ring sector 40.

Figure 3:
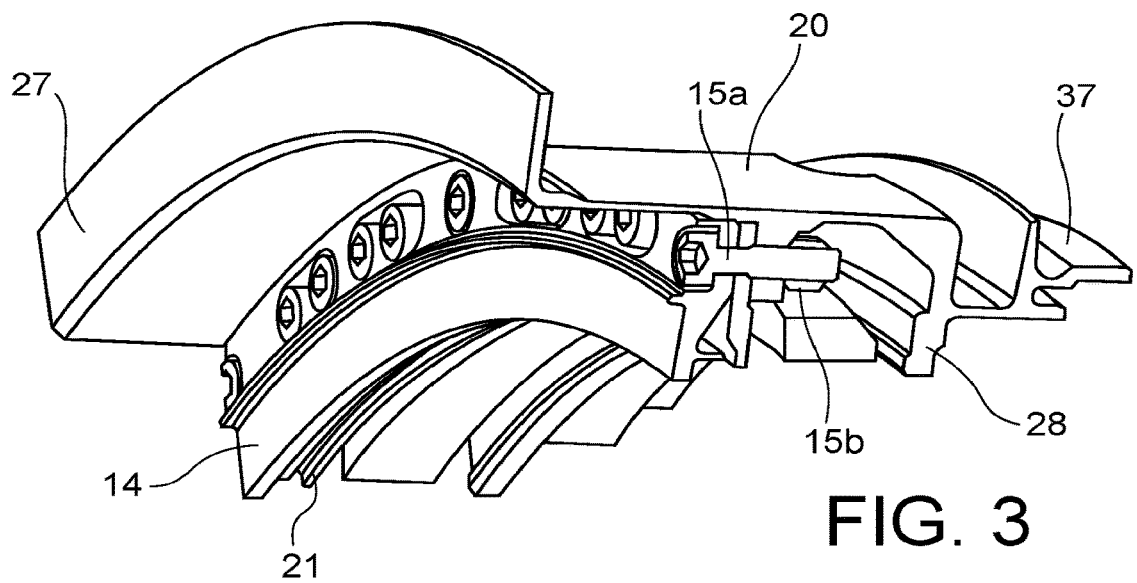
FIG. 3 shows a partial diagrammatic view of a ring support structure of a high pressure turbine according to the first embodiment.
Figure 4:
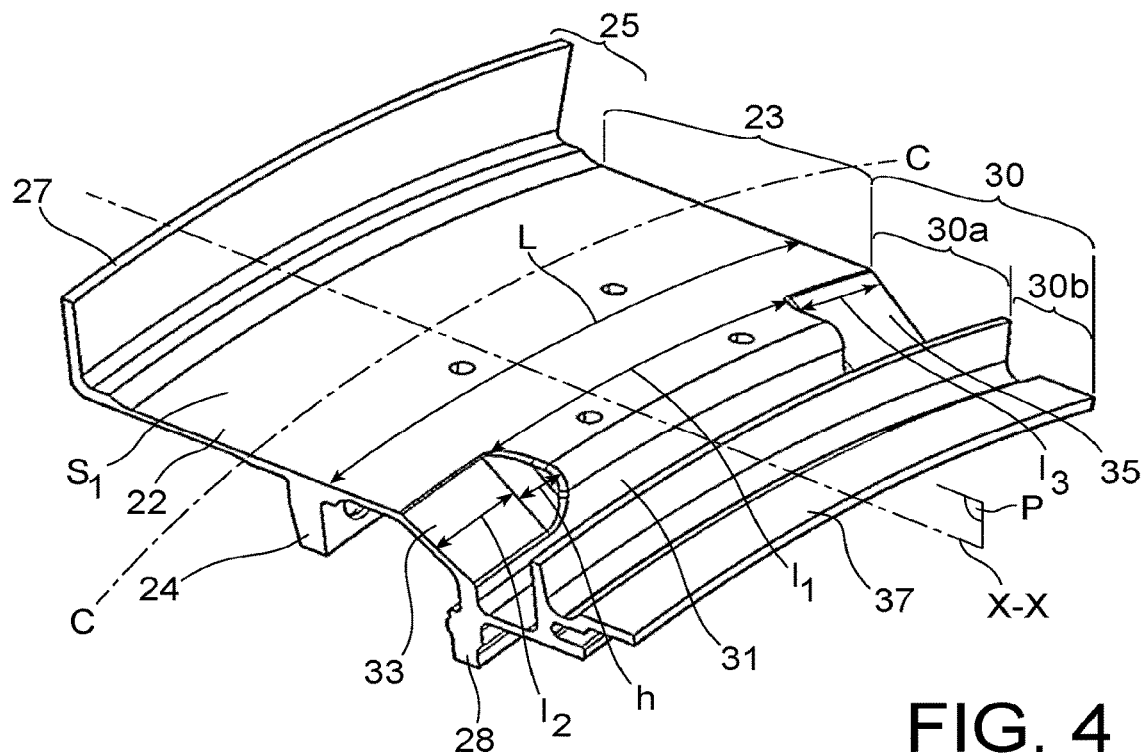
FIG. 4 is a partial diagrammatic perspective view of an angular portion of the support case of the high pressure turbine of the turbomachine according to the first embodiment.

With reference to all of FIGS. 2 to 4, the support case 20 is symmetric about a median longitudinal sectional plane P of the support case. It extends along a longitudinal direction X-X in this plane that is substantially parallel to the direction of the longitudinal axis of the turbomachine AX. The support case 20 is partially annular around its longitudinal X-X axis, and also extends along a circumferential direction C-C around this axis.

FIGS. 3 and 4 represent the angular portion of the support case 20 that is facing the ring sector 40 that is shown on FIG. 2. The support case 20 extends approximately 360° around its longitudinal X-X axis and it comprises several angular portions like that shown on FIG. 4.

Unless mentioned otherwise, the adjectives "axial", "radial" and "circumferential" are defined relative to the X-X axis of revolution of the support case 20. An axial direction is a direction substantially parallel to the longitudinal X-X axis of the support case 20. A radial direction is a direction substantially orthogonal to the X-X axis of the support case 20 and that intersects the X-X axis of the support case 20. A circumferential direction is a direction around the longitudinal X-X axis of the support case 20.

The support case 20 is made from a metallic material that has a higher mechanical strength than the material from which the ring sectors 40 are made, and higher thermal expansions.

The support case 20 comprises a body 22, an upstream edge 24 and a downstream edge 28. It also comprises an upstream region 25, central region 23 and a junction region 30 that comprises the downstream edge 28, in that order from upstream to downstream.

The upstream region 25 comprises the upstream edge 27 that fastens the support case 20 to the turbine case 11. The upstream edge 27 delimits the support case 20 in the axially upstream direction. It projects towards the exterior of the case from the central region 23. It extends approximately around the entire circumferential length C-C of the case.

The central region 23 comprises the body 22 and the upstream edge 24. The body 22 comprises an external surface $S_1$ facing towards the turbine case 11 and an internal surface $S_2$ facing towards the mobile blades 17 and that is opposite the external surface $S_1$. The external surface $S_1$ and the internal surface $S_2$ extend along the axial direction. Each forms a flat surface of the body 22. The external surface $S_1$ is radially opposite the internal surface $S_2$.

The upstream edge 24 extends from the body 22 in the radial direction towards the inside of the case 20. It forms a flange for connection of the upstream case 21 to the body 22. It is connected to the upstream case by the attachment element 15.

The junction region 30 forms a region downstream from the support case 20. It comprises a first connection region 30a, the downstream edge 28 and a second connection region 30b. The junction region 30 is used to connect the support case 20 to a guide vane assembly located downstream from the mobile blades 17.

The first connection region 30a is located axially between the body 22 and the second connection region 30b. It is configured to connect the body 22 to the downstream edge 28. It comprises a plurality of circumferential edges each associated with a ring sector 40, that are adjacent to each other along the circumferential direction C-C and each of which has the same circumferential length as one of the ring sectors 40.

Each circumferential edge comprises a central portion 31 and two lateral portions 33, 35 that are located on opposite sides of the central portion 31 along the circumferential direction C-C.

The second connection region 30b is configured to connect the support case 20 to the guide vane assembly. It comprises a downstream attachment edge 37 that delimits the support case 20 in the downstream direction. The downstream edge 37 projects towards the exterior of the case from the central region 23. It extends approximately around the entire circumferential length C-C of the case. The downstream attachment edge 37 is used to attach the support case 20 to the guide vane assembly located downstream from the mobile blades rotor 17.

The downstream edge 28 extends from the body 22 in the radial direction towards the inside of the case 20. In the axial direction, it is located in a region downstream from the circumferential edge 30a. It extends approximately around the entire circumferential length C-C of the case. It is made in a single piece with the body 22 to limit air leaks between the ring sectors 40 and the downstream edge 28.

The downstream edge 28 comprises a lip 28a configured to form a straight line support in contact with the downstream leg 44 to limit leaks between the downstream edge 28 and each ring sector 40, particularly at the junction of two rings sectors placed circumferentially end to end. The downstream edge 28 is an attachment edge of the downstream leg 44 of the ring sector 40.

The sectorised nature of the ring sectors 40 facing the single-piece downstream edge 28 tends to increase the mechanical stress applied by the downstream edge 28 on the ring sectors 40. The distance between the external surface $S_1$ of the case 28a and the lip varies along the circumferential direction C-C, which tends to vary the intensity of mechanical forces applied by the support case 20 in the circumferential direction on the ring sectors 40. Mechanical stresses applied by the support case 20 then tend to be maximum at the ends of the ring sectors 40, which is prejudicial to their mechanical strength.

Each central portion 31 and the corresponding lateral portions 33, 35 are configured to reduce the maximum intensity of mechanical forces that are applied by the support case 20 on the ring sectors 40. They lead to a more uniform distribution of mechanical forces transmitted by the support case 20 to the ring sectors 40 along the first connection region 30a.

With reference to FIG. 4, the first connection region 30a extends substantially along the entire circumferential length C-C of the ring sector 40 that is shown on FIG. 2. In the axial direction, it is located between the upstream edge 24 and the downstream attachment edge 37.

The central portion 31 projects radially outwards from the external surface $S_1$ of the body 22. It forms a boss from the support case 20. The stiffness of the support case 20 is locally higher at the central portion 31. This local increase in the stiffness of the case 20 compensates for the larger lever arm between the external surface $S_1$ at the central portion 31 and the lip 28a of the downstream edge at the central portion 31.

The first lateral portion 33 forms a recess in the case 20 from the external surface $S_1$ at the body 22. The stiffness of the support case 20 is locally lower at the first lateral portion 33. This local reduction in the stiffness of the case 20 compensates for the smaller lever arm between the external surface $S_1$ at the first lateral portion 33 and the lip 28a of the downstream edge at the first lateral portion 33.

The second lateral portion 35 also forms a recess in the case 20 from the external surface $S_1$ at the body 22. The shape of the second lateral portion 35 is substantially the same as the shape of the first lateral portion 33. The stiffness of the support case 20 is locally lower at the second lateral portion 35. This local reduction in the stiffness of the case 20 compensates for the smaller lever arm between the external surface $S_1$ at the second lateral portion 35 and the lip 28a of the downstream edge at the second lateral portion 35.

The maximum height h of the central portion 31 above each of the lateral portions 33, 35 is between 3 mm and 30 mm.

The circumferential length $l_1$ of the central portion 31 relative to the length L of circumferential edge associated with the ring sector 40 is between ⅕ and ⅘.

The circumferential length $l_2 l_2$ of the first lateral portion 33 relative to the length L of circumferential edge associated with the ring sector 40 is between ¹⁄₁₀ and ⅖. The circumferential length $l_3$ of the second lateral 35 is identical to that of the first lateral portion 33.

The first connection region 30a thus reduces the intensity of tension forces applied on ring sectors 40 while reducing leaks between the downstream edge 28 and the ring sectors 40.

The central portion 31 and the lateral portions 33, 35 of each circumferential edge of the first connection region 30a can reduce the maximum intensity of mechanical forces applied by the support case 20 on the ring sectors 40, while limiting air leaks at the junction between the ring sector 40 and the support case 20. The mass of the support case 20 is also limited, particularly being substantially identical to the mass of a support carrier 20 with a uniform first connection region 30a along the circumferential direction C-C.

Obviously, an expert in the subject could make various modifications to the invention that has just been described without going outside the framework of the presentation of the invention.

The support case 20 can be used to connect rotor blades of the low pressure turbine 10 to the turbine case 11.

The shape of the support case 20 is variable. For example, the support case 20 does not have to be symmetric about its longitudinal X-X axis. It can also extend over an angular distance less than 360° around its longitudinal X-X axis, while remaining sectorised.

The shape of the first connection region 30a is variable. In particular, the shape of each central portion 31 can vary, as can its length $l_1$ and its height h relative to the lateral portions 33, 35. Similarly, the shape of each lateral portion 33, 35 can vary, as can their length, $l_2$, $l_3$ and their depth. The shape, length and depth of the second lateral portion 35 can be different from the shape, length and depth of the first lateral portion 33 of the circumferential edge.

The invention claimed is:

1. A support case for turbomachine sealing ring sector, comprising:
    an annular body which is annular around a longitudinal axis of the support case, wherein the annular body comprises an internal surface and an external surface which is opposite the internal surface, and wherein the internal surface and the external surface extend axially along the longitudinal axis,
    a downstream edge configured for attachment of the ring sector, wherein the downstream edge extends from the annular body radially towards an inside of the support case and wherein the downstream edge extends from the annular body circumferentially along a junction region between the annular body and a guide vane assembly,
    wherein the junction region comprises a first connection region configured to connect the annular body to the downstream edge, and wherein the junction region comprises a second connection region configured to be fixed to the guide vane assembly,
    wherein the first connection region comprises a central portion and two lateral portions which are located on each side of the central portion, along a circumferential direction of the support case about the longitudinal axis of the support case, and
    wherein the central portion extends from the external surface by projecting radially relative to the longitudinal axis of the support case outwards from the support case with respect to the lateral portions.

2. The support case according to claim 1, wherein at least one of the lateral portions comprises a recess in the external surface of the annular body.

3. The support case according to claim 1, wherein the central portion comprises a projecting portion projecting from the external surface of the annular body.

4. The support case according to claim 1, further comprising an upstream edge for attachment of the ring sector, wherein the upstream edge extends from the annular body radially towards the inside of the support case, and wherein the upstream edge extends from the annular body circumferentially along the annular body,
    wherein the second connection region comprises a downstream attachment edge to fix the support case to the guide vanes assembly, wherein the downstream attachment edge is located downstream from the central portion and from the lateral portions.

5. The support case according to claim 1, wherein at least one of a maximum projection height of the central portion projecting above at least one of the lateral portions is between 3 mm and 30 mm, a circumferential length of the central portion with respect to a circumferential length of a ring sector is between ⅕ and ⅘, or a circumferential length of at least one lateral portion with respect to the circumferential length of the ring sector is between ¹⁄₁₀ and ⅖.

6. The support case according to claim 1, wherein the junction region is substantially symmetric about a median longitudinal section plane of the support case.

7. The support case according to claim 1, wherein the downstream edge comprises a lip which is configured to be in contact with a downstream leg of the ring sector.

8. A turbine ring assembly comprising:
    a support case; and
    a ring sector that is fixed to the support case, wherein the ring sector comprises an upstream leg and a downstream leg, wherein the upstream leg is fixed to the upstream edge of the support case and wherein the downstream leg is fixed to the downstream edge of the support case, wherein the support case comprises:

an annular body which is annular around a longitudinal axis of the support case, wherein the annular body comprises an internal surface and an external surface which is opposite the internal surface, and wherein the internal surface and the external surface extend axially along the longitudinal axis, and a downstream edge configured for attachment of the ring sector, wherein the downstream edge extends from the annular body radially towards an inside of the support case and wherein the downstream edge extends from the annular body circumferentially along a junction region between the annular body and a guide vane assembly, wherein the junction region comprises a first connection region configured to connect the annular body to the downstream edge, and wherein the junction region comprises a second connection region configured to be fixed to the guide vane assembly, wherein the first connection region comprises a central portion and two lateral portions which are located on each side of the central portion along a circumferential direction of the support case about the longitudinal axis of the support case, and wherein the central portion extends from the external surface by projecting radially relative to the longitudinal axis of the support case outwards from the support case with respect to the lateral portions.

9. The turbine ring assembly according to claim 8, comprising a plurality of ring sectors adjacent to each other around the circumferential direction and fixed to the support case, wherein the first connection region comprises one central portion along the circumferential direction for each ring sector, wherein each central portion is circumferentially located between two lateral portions, and wherein each central portion projects radially outwards from the case with respect to the lateral portions that are adjacent to the each central portion along the circumferential direction.

10. A turbine for turbomachine, comprising the turbine ring assembly according to claim 8.

11. The support case according to claim 2, wherein the projecting portion comprises a boss.

12. The support case according to claim 6, wherein the support case is substantially symmetric about a median plane.

13. The turbine ring assembly according to claim 8, wherein the ring sector is fixed to the support case by studs.

14. The turbine ring assembly according to claim 8, wherein the support case is made from a metallic material and wherein the ring sector is made from a ceramic matrix composite material.

15. The turbine according to claim 14, wherein the turbine is a high pressure turbine.

16. The support case according to claim 1, wherein the downstream edge extends radially inward from the internal surface of the annular body towards the inside of the support case.

17. The turbine ring assembly according to claim 8, wherein the downstream edge extends radially inward from the internal surface of the annular body towards the inside of the support case.

* * * * *